United States Patent Office 3,365,655
Patented Jan. 23, 1968

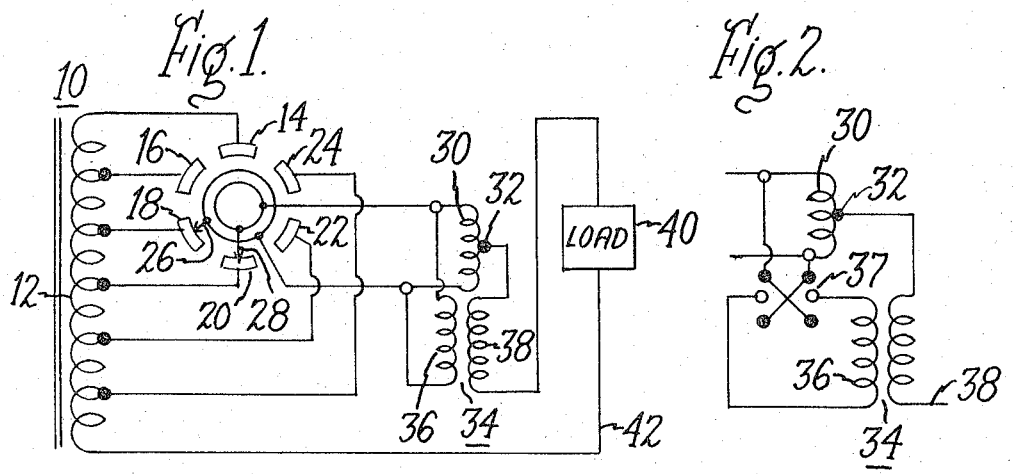
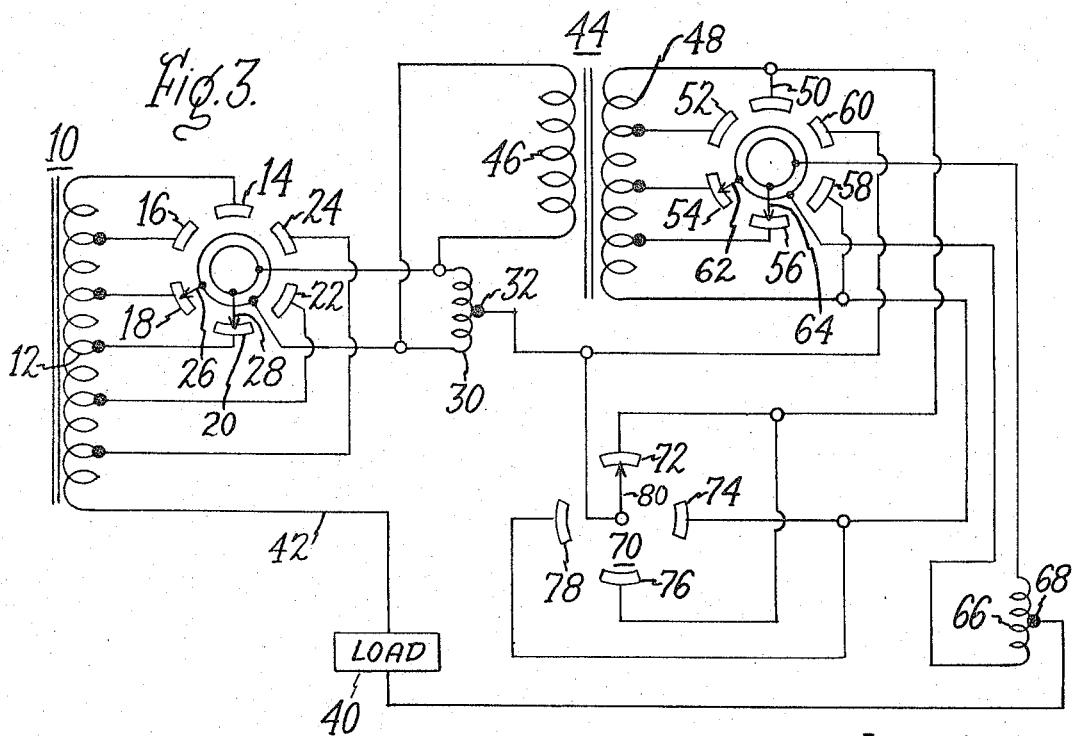

3,365,655
VOLTAGE REGULATORS HAVING VERNIER
VOLTAGE CONTROL
James W. Simpson, Dalton, and Robert H. Brennan,
Pittsfield, Mass., assignors to General Electric Company, a corporation of New York
Filed Oct. 22, 1965, Ser. No. 500,854
5 Claims. (Cl. 323—43.5)

This application relates to voltage regulators and more particularly to voltage regulators having vernier voltage control.

As is well understood by those skilled in this art, voltage regulators are used both to maintain voltages at predetermined levels and also to provide regulated voltages to various types of equipment in which the voltage may be varied over a wide range. In the latter case, such as in process equipment, it is often desirable to be able to apply the voltage in very small regulated increments. At other times it is desirable to rapidly change the applied voltage to higher or lower values. To perform such functions requires voltage regulators which have means for applying varying voltages over large increments, usually by means of a step regulator winding. Further, such regulators should have a fine vernier control which will provide a plurality of incremental voltage variations within the range of each step of the step regulator winding. Obviously, the vernier adjustment may be either another stepped winding or it may be an induction regulator. As will be understood, it is desirable to be able to provide large voltage changes by means of the stepped regulator winding without the necessity of operating the fine vernier control through its range of voltage changes. Of course it is always desirable to provide such regulation as economically as possible, utilizing simple mechanisms which will require relatively little maintenance.

It is therefore one object of this invention to provide a novel voltage regulator having both coarse and fine voltage control.

A further object of this invention is to provide a voltage regulator capable of a plurality of fine voltage variations which may also be operated to provide large variations.

Still another object of this invention is to provide a voltage regulator having a stepped regulator winding for large voltage changes and which is provided with a vernier voltage control which may be selectively used to provide fine voltage variations within the range of each step of the step regulator winding.

Still another object of this invention is to provide a voltage regulator having a stepped regulator winding for large voltage changes and which is provided with a vernier voltage control to provide fine voltage variations within the range of the steps of the step regulator winding where the step regulator winding may be operated to provide large voltage changes without operating the vernier voltage control through its range.

In carrying out this invention in one form, a voltage regulator is provided having a winding with a plurality of tap sections for varying the voltage provided by the regulator. Switching means are provided for connecting various tap sections to a load. The switching means are connected to the load through a vernier voltage regulator which may be used to provide a plurality of voltage changes between each tap section of the tap winding. The vernier voltage regulator is connected so as to provide a continuous completed circuit from the switching means to the load such that changes may be made continuously among the various tap sections without requiring that the vernier voltage regulator be in the neutral or set position for making the tap changes. Of course, the further the vernier voltage regulator is from neutral position the greater arcing duty there will be on the contacts of the tap section.

The invention which is sought to be protected will be clearly pointed out and distinctly claimed in the claims appended hereto. However, it is believed that this invention and the manner in which its various objects and advantages are obtained, as well as other objects and advantages thereof, will be better understood from the following detailed description of preferred embodiments especially when considered in the light of the accompanying drawings, in which:

FIGURE 1 is a schematic circuit diagram of a voltage regulator having a vernier voltage control in the form of an induction regulator according to one embodiment of this invention;

FIGURE 2 is a partial schematic circuit diagram of a modified form of the voltage regulator of FIG. 1 showing the use of a reversing switch;

FIGURE 3 is a schematic circuit diagram of a voltage regulator having a vernier voltage control in the form of a step winding according to another form of this invention.

Figure 4:
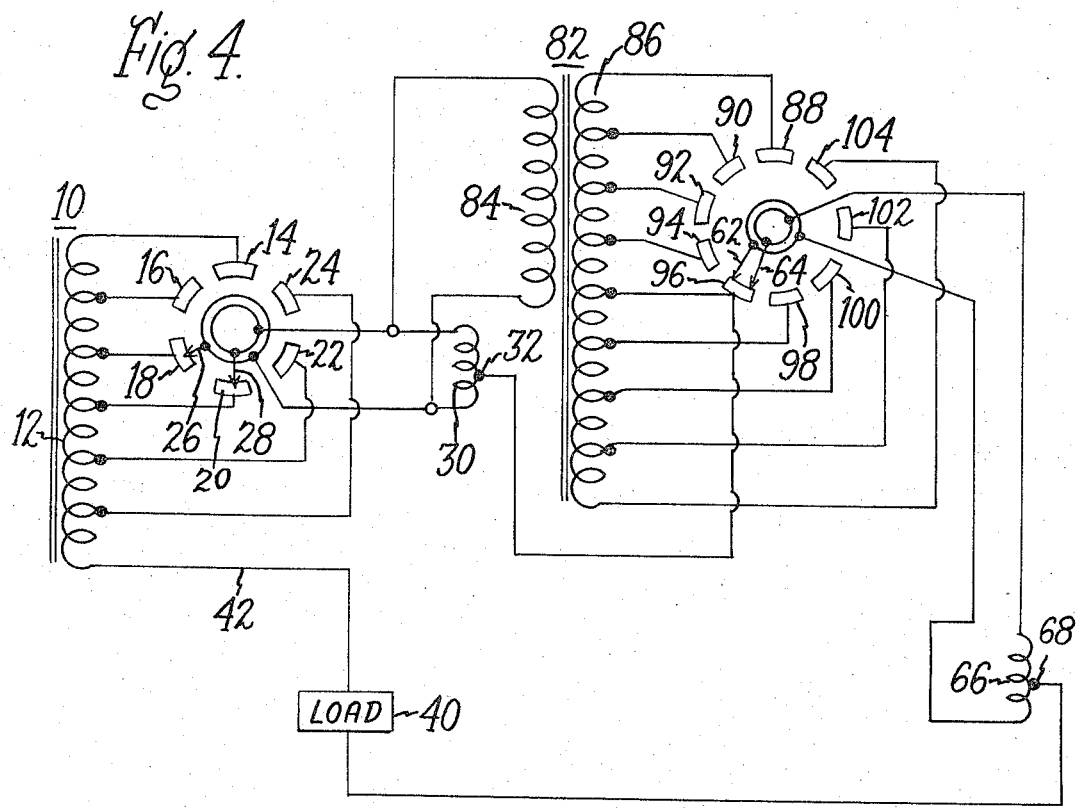
FIGURE 4 is a schematic circuit diagram of a modified form of voltage regulator similar to FIG. 3.

The voltage regulator of this invention will be described with particular reference to the drawings, wherein like numerals are used to indicate like parts throughout the various figures. Considering first FIG. 1, there is shown a transformer 10 having a tapped or stepped winding 12. The winding 12 is shown as divided into six equal tap sections which are connected to the circularly arranged contact members 14, 16, 18, 20, 22 and 24. As will be understood, winding 12 is used to provide coarse voltage changes and may be divided into as many sections as is desired. A switching means is provided, being shown in the form of a pair of movable fingers 26 and 28. These fingers 26 and 28 may be electrically connected to any one of the various contacts 14 through 24, or may be connected to bridge a pair of adjacent contacts. As shown in FIG. 1, finger 26 is electrically connected to contact 18, while finger 28 is electrically connected to contact 20. As will be understood fingers 26 and 28 are designed to rotate between the various contacts 14 through 24 in such a manner that at least one finger will always be electrically connected to at least one contact. As shown, the fingers 26 and 28 are electrically connected to opposite ends of a current limiting reactor 30. Current limiting reactor 30 is provided in the usual manner with a center tap 32.

An induction regulator 34 is provided for fine voltage changes. One winding 36 of induction regulator 34 is connected across fingers 26 and 28. This winding 36 may be considered the primary winding of induction regulator 34. The other winding 38, considered as the secondary, has one end connected to the mid tap 32 on current limiting reactor 30, while the other end is connected to any desired load indicated at 40. In the usual manner, the other end of load 40 is connected to one end of winding 12 as indicated by lead 42.

The operation of the voltage regulator of FIG. 1 will now be described. With fingers 26 and 28, bridging contacts 18 and 20 as shown, the mid tap 32 of current limiting reactor 30 will be at a potential halfway between that of the contacts 18 and 20. This potential will appear across load 40 through winding 38 of the induction regulator 34. The primary winding 36 is connected across the fingers 26 and 28 and, therefore, has the potential of the tap section between these fingers. In this instance it is of course the tap section between contacts 18 and 20. As will be apparent, winding 38 may be rotated relative to winding 36 to provide a bucking or a boosting voltage to the voltage at mid tap 32. In the preferred form of this embodiment of the invention, the ratio of winding 38 to winding 36 is one half. By properly positioning winding 38 the voltage applied to load 40 may be that of either contact 18 or contact 20 or any potential between these values.

When the potential applied to load 40 is that of contact 20, fingers 26 and 28 can be rotated until both fingers are on contact 20 without any change in the voltage applied to load 40. As will be understood, there will be no load current flowing in contact 18. Thus the interrupting duty on contact 18 will only be that of the exciting current of reactor 30 and regulator 34. Of course, with both fingers 26 and 28 on contact 20 no voltage is impressed across winding 36 and, therefore, no voltage induced in winding 38. Due to the electrical connections of mid tap 32 through winding 38 to load 40, the potential on load 40 will remain that of contact 20 regardless of the position of winding 38. In order to provide continuous small voltage variations to load 40, it is necessary that secondary 38 be rotated with respect to primary 36 to reverse the polarity of the induced voltage in secondary 38 with respect to winding 12 while both fingers 26 and 28 are on the same contact, such as contact 20. With secondary 38 rotated it may provide the same potential to the load 40 as that of the first contact when the fingers 26 and 28 are moved to bridging connection with the next contact. For example, contact 20 when fingers 26 and 28 bridge contacts 20 and 22. This can be accomplished by rotating the winding 38 180° as above discussed to provide the desired induced bucking or boosting voltage from winding 36. Alternatively, the polarity of winding 36 can be changed.

One example of a means for changing the polarity of winding 36 is shown in FIG. 2. In this instance a reversing switch 37 is provided alternately connected to opposite ends of the current limiting reactor 30 as shown. As will be understood, by operating the reversing switch the polarity of winding 36 will be changed. With the change in the polarity of winding 36 there is no need to move winding 38 to maintain the desired potential on load 40 when fingers 26 and 28 are moved to a bridging position.

It should be noted with respect to the voltage regulator of FIGS. 1 and 2 that the coarse taps on winding 12 may be changed at any time regardless of the position of induction regulator 34. As can be seen in both FIGS. 1 and 2, the circuit from the fingers 26 and 28 is always completed to the load 40 through the winding 38. While the coarse taps on winding 12 may be changed at any time without interrupting the circuit to load 40, it is desirable that the taps be changed when regulator 34 is positioned to assume a potential halfway between the taps. With the regulator 34 in this position continuous tap changes may be made with the least arcing of the contacts. Of course, it will be understool that fingers 26 and 28 move in unison so that one finger is always in electrical engagement with one of the contacts 14 through 24.

Referring now to FIG. 3 of the drawings, another form of the voltage regulator of this invention is shown in which a tapped transformer winding is used as a vernier control in place of the induction regulator of FIGS. 1 and 2. The transformer 10, winding 12 and contacts 14 through 24, as well as switch fingers 26 and 28, current limiting reactor 30 with midpoint 32 are the same as described with reference to FIG. 1. In this modification a transformer 44 is provided having one winding 46 connected across fingers 26, 28 as shown. The other winding 48 is tapped, the taps being provided with circularly arranged contacts 50, 52, 54, 56 and 58. Winding 48 is designed so that the voltage between the upper and lower contacts, that is contacts 50 and 58, is equal to one-half of the voltage of the tap sections of winding 12. A neutral contact 60, connected to the mid tap 32 of reactor 30, is circularly arranged with the contacts 50 through 58, as shown. A switching means, including movable fingers 62, 64 is provided, the fingers being connected and operated such that they may make electrical connection with any single contact or may bridge any adjacent pair of contacts. As will be understood contacts 62 and 64 move in unison such that an electrical connection is always made between one of the movable fingers and one of the contacts. As shown in FIG. 3, the fingers 62, 64 are in bridging connection with the contacts 54, 56, respectively. A current limiting reactor 66 is provided connected across the fingers 62, 64 and is center tapped at 68. The load 40, to be energized by the regulator, is connected to mid tap 68 and one end of winding 12 by lead 42.

A reversing switch 70 is provided having four contacts, 72, 74, 76 and 78 circularly arranged about the switch finger 80. Switch finger 80 is electrically connected to neutral contact 60 and center tap 32 of reactor 30 while alternate contacts are connected to opposite ends of the winding 48. As shown in FIG. 3 contacts 72 and 76 are connected to the upper end of winding 48, that is contact 50, while contacts 74 and 78 are connected to the lower end of winding 48, that is contact 58. The neutral contact 60 is a transfer point allowing operation of the reversing switch 70. It should be noted that the contacts 72, 74, 76 and 78 are arranged about finger 80 and connected to winding 48 such that the polarity of winding 48 is changed with each operation of finger 80, independent of the direction of rotation.

As will be apparent from the above description the transformer 44 operates around the voltage of mid tap 32 applying a bucking or boosting voltage to the voltage of mid tap 32. As shown in FIG. 3, transformer 44 will add or subtract a voltage equal to the voltage between contacts 50, 54, equivalent to two tap sections of winding 48, plus one-half of the voltage between contacts 54 and 56, to the voltage of the mid tap 32. The addition or subtraction of voltage will depend upon the polarity of winding 48. Assuming that contact 50 on winding 48 is the same polarity as contact 20 on winding 12, then the voltage of transformer 44 will add to the voltage of mid tap 32. As switch fingers 62, 64 moved toward contact 58 a greater amount of voltage is added to that of mid tap 32. When both fingers 62, 64 are on contact 58 the potential will be the same as that of contact 18 on winding 12.

When fingers 62 and 64 are on contact 58, finger 28 can leave contact 20 moving to contact 18 with finger 26. Since this shorts winding 46 no voltage appears across winding 48. However, contact 58 is electrically connected to the mid tap 32 of reactor 30 through winding 48 and contact 72 and finger 80 of the reversing switch 70. Thus the potential on load 40 will remain that of contact 18. Fingers 62 and 64 can now be moved to neutral contact 60 and reversing switch 70 may be rotated either to contact 74 or contact 78 to reverse the polarity of winding 48. Fingers 62 and 64 can then be moved to contact 50 without changing the potential applied to load 40. As will be understood fingers 62 and 64 operate in the same meanner as fingers 26 and 28 so that one finger is always electrically connected to one of its contacts. Contact 50 will now have a polarity such that the voltage of transformer 44 will become the voltage of mid tap 32. Finger 26 may now be moved to contact 16 while finger 28 remains on contact 18. The voltage applied to load 40 will be that of mid tap 32 less the voltage of transformer 44. Since transformer 44 is designed to have one-half the voltage of the tape sections, the applied voltage will still be that of contact 18. Fingers 62 and 64 can continue to rotate about contacts 50 through 58 subtracting lesser amount of voltage from mid tap 32. When fingers 62 and 64 reach contact 58 there will be applied a potential equal to that of the mid tap 32. Obviously, at this point the same sequence begins over with the polarity of winding 48 being again changed by reversing switch 70. Of course it will be apparent that the voltage regulator of FIG. 3 is equally useful for decreasing voltage merely by reversal of the above-described operation.

It should be noted that in this modification the coarse taps on winding 12 may be changed at any time regardless of the position of fingers 62, 64 of the vernier transformer 44. As is apparent from FIG. 3, the circuit to load 40 from fingers 26 and 28 is always completed directly through contact 60 or else through the winding 48. As earlier pointed out, it is desirable that the taps on winding 12 be changed when the vernier control is positioned so that the vernier voltage is that of midpoint 32 of reactor 30. In this position of the vernier, the taps may be continuously changed on winding 12 with the least amount of arcing on the contacts.

FIGURE 4 shows a modification of the regulator of FIG. 3 in which the reversing switch may be eliminated. The coarse transformer 12, its contacts 16 through 24 and the circuit through current limiting reactor 30 are as previously described. In FIG. 4 a transformer 82 is provided for vernier control having a winding 84 connected across fingers 26 and 28. The other winding 86 is tapped as is indicated by two circularly arranged contacts 88, 90, 92, 94, 96, 98, 100, 102 and 104. Switching means are provided similar to FIG. 3 having movable fingers 62, 64 for electrically connecting the various contacts to a current limiting reactor 66 which is center tapped at 68. A load 40 is connected between center tap 68 and one end of winding 12 by lead 42.

In this embodiment winding 84 has 9N turns, while winding 86 has 8N turns divided into 8 equal sections. When fingers 26, 28 are on contacts 18 and 20 respectively, and fingers 62, 64 are on contact 96, the voltage applied to load 40 is equal to that at the center point of the tap section between contacts 18 and 20. As can be seen from FIG. 4, contact 96 is connected directly to mid tap 32 of the current limiting reactor 30. Therefore, in this position of fingers 62, 64 load 40 is essentially connected directly to center tap 32. As the fingers 62 and 64 move up from contact 96 toward the contact 88 the voltage for each full step will increase by ⅑ of the tap section voltage. As will be understood each full step is the movement of both fingers from one contact to the next, that is, movement of fingers 62, 64 from contact 96 to contact 94. Each bridging position of fingers 62, 64 will equal ⅟₁₈ of the vernier tap section voltage. As fingers 62, 64 reach contact 88, the voltage will have increased by 4/9 of the vernier tap section voltage. The next step to increase the voltage is to move the finger 28 to contact 18, this will increase the voltage another ⅟₁₈, that is, the equivalent of a half step of the vernier control. This will make the voltage applied to load 40 equal to that of contact 18. Fingers 62 and 64 can now be moved to contact 104 without producing any voltage change on load 40. Finger 26 can then be moved to contact 16 while finger 28 remains on contact 18. This will increase the voltage applied to load 40 ⅟₁₈ of the vernier tap section voltage. The fingers 62 and 64 may then rotate around the contacts 104, 102 to contact 88, increasing the voltage to load 40 by each half step. Thus the modification of FIG. 4 provides for a continuous increase in voltage without use of a reversing switch. Of course, it will be understood that by merely reversing the movements of fingers 26, 28 and 62, 64 the voltage may be decreased continuously.

Again it should be noted with reference to FIG. 4 that in this modification the coarse taps on winding 12 can be changed at any time regardless of the position of fingers 62, 64. As is apparent from FIG. 4 the circuit from fingers 26, 28 to the load 40 is always complete either directly through the contact 96 or else through the winding 86. As earlier discussed, it is desirable that the taps on winding 12 be changed when the vernier control is positioned so that the vernier voltage is that of midpoint 32 of reactor 30, in this case contact 96. This provides the least amount of arcing on the contacts of winding 12 for continuous tap changing of winding 12.

From the above it will be clear that by means of this invention there is provided a voltage regulator having vernier voltage control in which coarse changes in voltage may be made continuously and in which a circuit is always completed from coarse winding to the load regardless of the position of the vernier voltage control. Of course, it will be understood that in all forms of the invention suitable means are provided to operate the various tap changing mechanisms in synchronism or in any desired sequence. While there has been shown and described the presently preferred embodiments of this invention it will of course be understood that various changes may be made in structural details without departing from the spirit and scope of the invention, particularly as set forth in the appended claims.

What is claimed as new and which it is desired to secure by Letters Patent of the United States is:

1. A voltage regulator having vernier voltage control comprising, in combination:
   (A) a first induction means, a winding of said first induction means divided into a plurality of equally spaced tap sections,
      (1) a plurality of circularly arranged contacts, each of said contacts being connected to said winding at one of said plurality of said tap sections,
      (2) switching means including a pair of movable fingers,
         (a) said movable fingers positioned to engage said plurality of circularly arranged contacts, said movable fingers movable in unison such that at least one finger will always be in electrical engagement with at least one contact,
      (3) a current limiting reactor connected at opposite ends to said movable fingers,
      (4) a center tap on said current limiting reactor,
   (B) a second induction means, one winding of said second induction means connected across said movable fingers in parallel circuit relation with said current limiting reactor,
      (1) a second winding of said second induction means, means connecting said second winding to said center tap of said current limiting reactor,
         (a) said second winding effective to provide bucking or boosting voltages to vary the voltage between said tap sections of said winding of said first induction means,
   (C) and means completing a circuit from said center tap of said current limiting reactor to a load through said second winding whereby said movable fingers may be moved at any time to different ones of said circularly arranged contacts without opening said circuit to said load.

2. A voltage regulator having vernier voltage control as claimed in claim 1 in which said second induction means is an induction regulator.

3. A voltage regulator as claimed in claim 1 in which said second induction means is a transformer, and said second winding is a tapped winding having a plurality of circularly arranged contacts, and said means connecting said second winding to said center tap of said current limiting reactor comprises a pair of movable fingers connected so as to electrically engage at least one of said plurality of contacts of said second winding.

4. A voltage regulator as claimed in claim 3 in which a reversing switch is electrically connected between said contacts of said second winding and said center tap of said current limiting reactor.

5. A voltage regulator as claimed in claim 1 in which said second induction means is a transformer in which said one winding connected across said movable fingers has 9 N turns and in which said second winding has 8 N turns divided into 8 equal sections, said second winding having 8 circularly arranged contacts, the mid contact being connected to the center tap of said current limiting reactor, and a pair of contact fingers movable between said contacts of said second winding so as to always electrically engage at least one of said contacts of said second winding.

References Cited

UNITED STATES PATENTS

| | | | |
|---|---|---|---|
| 3,100,865 | 8/1963 | Nielsen | 323—43.5 |
| 3,122,698 | 2/1964 | Ladd | 323—43.5 |

JOHN F. COUCH, *Primary Examiner.*

W. E. RAY, *Assistant Examiner.*